United States Patent [19]

Jones et al.

[11] Patent Number: 5,005,659
[45] Date of Patent: Apr. 9, 1991

[54] POWER ASSISTED STEERING FOR VEHICLES

[75] Inventors: John Jones, Essignton; Rinaldo G. Uccellini, Wolverhampton, both of England

[73] Assignee: Yale Materials Handling Limited, Wolverhampton, England

[21] Appl. No.: 156,170

[22] Filed: Feb. 12, 1988

[51] Int. Cl.$^5$ .......................... B60K 1/00; B62D 5/00
[52] U.S. Cl. .................... 180/65.1; 180/142; 180/79.1; 290/9; 290/45; 388/815
[58] Field of Search ............... 180/65.1, 65.8, 79.1, 180/53.5, 132, 141, 142, 143; 318/317; 290/45, 9, 11, 12, 14

[56] References Cited

U.S. PATENT DOCUMENTS

| | | | |
|---|---|---|---|
| 2,167,224 | 7/1939 | Ulinski | 180/79.1 |
| 3,289,780 | 12/1966 | Ferris | 180/65.1 X |
| 4,008,779 | 2/1977 | Shinoda et al. | 180/132 X |
| 4,418,778 | 12/1983 | Sato et al. | 180/132 |
| 4,549,627 | 10/1985 | Takeshima et al. | 180/142 |
| 4,590,409 | 5/1986 | Kubota | 180/132 X |

FOREIGN PATENT DOCUMENTS 59-18066  1/1984  Japan .................... 180/132

Primary Examiner—Charles A. Marmor
Assistant Examiner—Tamara L. Finlay
Attorney, Agent, or Firm—Brooks & Kushman

[57] ABSTRACT

An electrically propelled vehicle with hydraulic power steering supplied from an electricaly driven pump includes a sensor for sensing any voltage generated in the traction motor of the vehicle, for example, when it is coasting, and after comparing this generated voltage with a reference voltage a sensor for signalling the actuation of the power steering pump when the generated voltage exceeds the reference voltage.

3 Claims, 1 Drawing Sheet

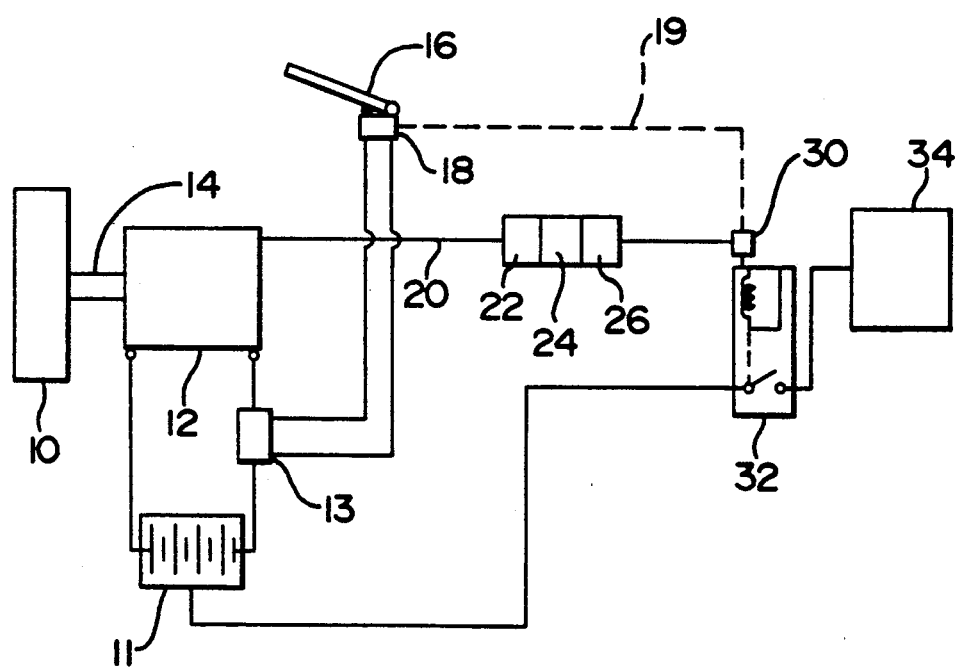

POWER ASSISTED STEERING FOR VEHICLES

BACKGROUND OF THE INVENTION

I. Field of the Invention

The present invention concerns improvements in or relating to vehicles, especially but not exclusively electrically propelled vehicles, and particularly to power assisted steering for wheeled electrically propelled vehicles.

II. Description of the Prior Art

Many electrically propelled vehicles, for example fork-lift trucks, incorporate a hydraulic power steering system which is supplied by pressurized hydraulic fluid from an electrically driven pump. As the power supply from the pump is taken from the vehicle's battery it is desirable that it is only actuated when there is a demand for powered steering assistance. One method of achieving this object has been to incorporate a microswitch in the power supply to the pump which causes power to the pump to be cut off when the vehicle's accelerator pedal is not depressed. This prior proposal, however, has the disadvantage that no power steering assistance is given if the vehicle is moving and the accelerator is not depressed, for example when it is coasting downhill or coasting to a stop.

SUMMARY OF THE INVENTION

It is an object of the present invention to obviate or mitigate this disadvantage.

According to the present invention there is provided apparatus for actuating the power supply of a power steering assembly for an electrically propelled vehicle, comprising means for detecting any voltage generated by a traction motor of the vehicle and switch means operable by said voltage to actuate a power supply to the power steering assembly of the vehicle.

Preferably, the apparatus includes a comparator for comparing the voltage generated by the traction motor with a fixed reference voltage whereby said switch means is actuated only when the generated voltage is greater than the fixed reference voltage.

BRIEF DESCRIPTION OF THE DRAWING

An embodiment of the present invention will now be described by way of example only with reference to the accompanying drawing in which FIGURE 1 shows a block diagram of a control arrangement for a three-wheeled electrically powered vehicle.

DETAILED DESCRIPTION OF A PREFERRED EMBODIMENT

The embodiment illustrated in the drawing relates to a three-wheeled fork-lift truck but it is equally applicable to any vehicle having an electric drive motor or motors.

The drawing shows one driven wheel 10 connected to its motor 12 by an axle 14 and it will be realized that the other driven wheel has a similar arrangement. Power is normally supplied to the motor 12 from the battery 11 of the truck in accordance with the driver's wishes which are transmitted to the power supply means 13 by use of a normal accelerator pedal 16.

As in all electrical vehicles, it is important to conserve power thereby prolonging battery life, it is desirable to operate electric motors for driving hydraulic pumps only when pressurized fluid is required from the pump. Thus, if the truck is fitted with a hydraulic power steering system it is desirable that the electric motor for driving the hydraulic pump of the power steering assembly is not driven when the vehicle is at rest.

In the past, this condition has been detected by a microswitch which is actuated only when the accelerator pedal is depressed. This system has a serious disadvantage, however, resulting from the fact that the truck is often operated in a non-powered dynamic condition, that is when no power is being supplied to the motor 12 when the vehicle is coasting, for example, down an incline or to rest. Clearly the truck would become extremely difficult to manage if the power steering was not available during such conditions.

Connections are made to the electric motor 12 so that the low voltage generated due to the residual magnetic remanence in the motor pole shoes is transmitted by a line 20 to an amplifier 22. The amplified voltage from the amplifier 22 is then compared with a fixed reference voltage in a comparator 24 and when the generated voltage is greater than the reference voltage a control circuit 26 causes a switch means such as a coil driver 30 to energize the contractor coil 32 controlling the power supply from the truck battery to the pump motor 34 of the power steering assembly. To ensure that power steering is available when the truck is at rest or moving very slowly a microswitch 18 operable on initial depression of an accelerator pedal 16 to cause power to be supplied to the motor 12 and this voltage is signalled along the line 20, again to cause start-up of the power steer motor.

It will be realized that various modifications can be made without departing from the scope of the invention as described above. For example, the microswitch 18 may be connected directly to the coil driver 30 by line 19 so that low speeds or at rest with minimal pedal depression the driver actuates the motor 34 irrespective of the moving or unmoving condition of the motor 12.

What is claimed is:

1. Apparatus for actuating the power supply of a power steering assembly for an electrically propelled vehicle including an electric traction motor comprising:
   detecting means for detecting any voltage generated by the traction motor; and
   switch means operable by said voltage to actuate a power supply to the power steering assembly of the vehicle.

2. Apparatus as claimed in claim 1, including a switch means control having a comparator for comparing the voltage generated by the traction motor with a fixed reference voltage and outputting a signal when the generated voltage is greater than the fixed reference voltage, and wherein said switch means is actuated in response to said signal.

3. Apparatus as claimed in claim 1 and wherein actuating means are provided for actuating the switch means irrespective of the moving or unmoving condition of the traction motor.

* * * * *